United States Patent
Kawashima et al.

(10) Patent No.: US 8,189,667 B2
(45) Date of Patent: May 29, 2012

(54) MOVING PICTURE ENCODING APPARATUS

(75) Inventors: Yuji Kawashima, Ome (JP); Yoshihiro Kikuchi, Ome (JP); Shingo Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1429 days.

(21) Appl. No.: 11/796,948

(22) Filed: Apr. 30, 2007

(65) Prior Publication Data

US 2008/0037637 A1  Feb. 14, 2008

(30) Foreign Application Priority Data

Aug. 11, 2006 (JP) ................................. 2006-220371

(51) Int. Cl.
*H04N 7/12* (2006.01)
(52) U.S. Cl. .............................. 375/240.13; 375/240.15
(58) Field of Classification Search ............. 375/240.12, 375/240.13, 240.15
See application file for complete search history.

(56) References Cited

U.S. PATENT DOCUMENTS

| | | | |
|---|---|---|---|
| 5,786,855 A | 7/1998 | Chen et al. | |
| 6,157,676 A | 12/2000 | Takaoka et al. | |
| 7,369,707 B2 * | 5/2008 | Sakaguchi et al. | 382/239 |
| 7,466,774 B2 | 12/2008 | Boyce | |
| 7,688,893 B2 | 3/2010 | Morimoto et al. | |
| 2002/0118756 A1 | 8/2002 | Nakamura et al. | |
| 2004/0213348 A1 | 10/2004 | Kim et al. | |
| 2005/0243930 A1 * | 11/2005 | Asano et al. | 375/240.16 |
| 2005/0286630 A1 * | 12/2005 | Tong et al. | 375/240.03 |
| 2006/0067406 A1 * | 3/2006 | Kitada et al. | 375/240.16 |
| 2006/0120456 A1 * | 6/2006 | Tasaka et al. | 375/240.16 |
| 2006/0215763 A1 | 9/2006 | Morimoto et al. | |

FOREIGN PATENT DOCUMENTS

| | | |
|---|---|---|
| EP | 0 895 424 A2 | 2/1999 |
| JP | 9-23422 A | 1/1997 |
| JP | 2001-346216 A | 12/2001 |
| JP | 2005-160048 A | 6/2005 |
| JP | 2006-93881 A | 4/2006 |
| JP | 2006-191287 A | 7/2006 |
| WO | WO 2004/064255 A2 | 7/2004 |

OTHER PUBLICATIONS

Japanese Office Action dated Oct. 19, 2010 (and English translation thereof) in counterpart Japanese Application No. 2006-220371.
European Search Report dated Dec. 12, 2008, issued in a counterpart European application corresponding to related U.S. Appl. No. 11/089,648, EP 05102421.4.

(Continued)

*Primary Examiner* — Gilberto Barron, Jr.
*Assistant Examiner* — Virginia T Ho
(74) *Attorney, Agent, or Firm* — Holtz, Holtz, Goodman & Chick, PC (57) ABSTRACT

In a moving picture encoding apparatus, a processing load detection section detects a load and outputs load information and a video encoder judges a load level based on the load information. A start pixel in target pixels is determined depending on the load level, the evaluation value is calculated from pixels specified by the start pixel, a encoding cost is calculated based on the evaluation value to select one of prediction modes for minimizing the encoding cost. The start pixel is so selected as to exclude the pixels which are spatially neighboring to reference pixels for prediction, instead of all pixels within a 4×4 pixel block as the processing load becomes large. Thus, the picture processing amount is reducing while suppressing the deterioration of the encoding performance.

7 Claims, 6 Drawing Sheets

OTHER PUBLICATIONS

U.S. Appl. No. 11/089,648, filed Mar. 25, 2005; M. Morimoto et al entitled Video Encoder and Portable Radio Terminal Device.

Article entitled a Study on Efficient Intra Prediction Method in H.264 Encoding, Koichi Takagi, et al, KDDI Research Institute, ITE Winter Annual Convention 2004.

Publication entitled Joint Model Reference Encoding Methods and Decoding Concealment methods, Document JVT-J049, Mar. 2, 2004, Table of Contents pp. I-iv and pp. 1-34.

Wiegand, Thomas, et al, "Overview of the H.264/AVC video coding standard", IEEE Transactions on Circuits and Systems for Video Technology, IEEE Service Center, Piscataway, N.J., vol. 13, No. 7, Jul. 1, 2003, pp. 560-576, XP011099249, ISSN: 1051-8215.

Meng, Bojun, et al, "Efficient Intra-Prediction Algorithm in H.264", Dept. of Electrical and Electronic Engineering, Hong Kong University of Science and Technology, Clearwater Bay Road, Hong Kong, China, ICIP 2003.

* cited by examiner

| 0 | 1 | 5 | 6 |
|---|---|---|---|
| 2 | 4 | 7 | 12 |
| 3 | 8 | 11 | 13 |
| 9 | 10 | 14 | 15 |

FIG. 7

| 0 | 1 | 2 | 3 |
|---|---|---|---|
| 1 | 2 | 3 | 4 |
| 2 | 3 | 4 | 5 |
| 3 | 4 | 5 | 6 |

FIG. 8

| 0 | 1 | 2 | 3 |
|---|---|---|---|
| 1 | 1 | 2 | 3 |
| 2 | 2 | 2 | 3 |
| 3 | 3 | 3 | 3 |

FIG. 9

| 0 | 0 | 0 | 0 |
|---|---|---|---|
| 0 | 1 | 1 | 1 |
| 0 | 1 | 2 | 2 |
| 0 | 1 | 2 | 3 |

MOVING PICTURE ENCODING APPARATUS

CROSS-REFERENCE TO RELATED APPLICATIONS

This application is based upon and claims the benefit of priority from prior Japanese Patent Application No. 2006-220371, filed Aug. 11, 2006, the entire contents of which are incorporated herein by reference.

BACKGROUND OF THE INVENTION

1. Field of the Invention

The present invention relates to a moving picture encoding apparatus for encoding a moving picture.

2. Description of the Related Art

The MPEG is known as a technology of compressing and encoding a moving picture. In the MPEG, a moving picture is encoded with utilizing a combination of inter prediction, intra prediction, discrete cosine transformation (DCT) and variable-length encoding. In the H.264/AVC, if a texture of a moving picture is complex, a block of a moving picture is intra-predicted by a block unit of 4×4 pixels (hereinafter, referred to as "intra 4×4 prediction mode"), and if a texture of a moving picture is flat and simple, a target block of a moving picture is intra-predicted by a macro-block unit of 16×16 pixels (hereinafter, referred to as "intra 16×16 prediction mode"), so that the encoding efficiency of a moving picture is improved. In both cases, decoded pixels of the blocks neighbouring to the target block are used as reference pixels, and the difference between the original picture and a reference picture, i.e., prediction picture created based on the decoded pixels is encoded.

In the intra 16×16 prediction mode, there are four modes by each macro-block, and in the intra 4×4 prediction mode, there are nine modes by each 4×4 pixel block. In a selection processing of this intra 4×4 prediction mode, encoding costs for nine modes are calculated to select an encoding cost minimizing mode as the optimal encoding mode. Generally SAD (sum of absolute difference) between the original and reference picture is used as the encoding cost. Since the selection processing of this intra 4×4 prediction mode has a large number of modes of nine, the throughput required for calculating the encoding cost is high. On the other hand, if a mode is selected without using a suitable encoding cost, the encoding performance is severely affected.

Here, the number of pixels used for encoding cost calculation to select the intra 4×4 prediction mode is disclosed in Bojun Meng et. al. "Efficient Intra-Prediction Algorithm in H.264", ICIP 2003. In the middle or later part in the first chapter of this document, the algorithm of the reference software JM5.0 used in the JTV standardization is described. That is, in the equation (1) of Bojun Meng et. al. "Efficient Intra-Prediction Algorithm in H.264", ICIP 2003, SAD SAD_16 is added to all pixels in a 4×4 pixel block and encoding cost $4p\lambda(Qp)$ is added to the bit amount of encoding mode information (vertical prediction, horizontal prediction, etc.), calculating Cost_4×4 of the intra 4×4 prediction to select an encoding cost minimizing mode.

Further, in the second chapter of Bojun Meng et. al. "Efficient Intra-Prediction Algorithm in H.264", ICIP 2003, there is described the EIP method. That is, in the equation (3) of this document, SAD SAD_4 is added to four sub-sampled pixels and encoding cost $p\lambda(Qp)$ is added to the bit amount of encoding mode information, calculating the encoding cost by using Cost_4 of the intra 4×4 prediction to select an encoding cost minimizing mode.

However, target pixels in the 4×4 pixel block to be encoded are liable to have more similar pixel values in the prediction picture as they are spatially nearer to a neighboring block and to have more different picture values in the reference picture as they are spatially further from the neighboring block. Thus, the most part of the SAD of the 4×4 pixels obtained as the encoding cost is considered to consist largely of the SAD which is spatially far from the neighboring block.

BRIEF SUMMARY OF THE INVENTION

An object of the present invention is to provide a moving picture encoding apparatus and method which suppress the deterioration of the encoding performance and reduce the processing amount.

According to a first aspect of the present invention, there is provided an encoding apparatus for encoding a moving picture, comprising:

a detection unit configured to detect a processing load to output load information; and an encoder unit configured to encode the moving picture in accordance with one of prediction modes, the moving picture composed of pictures each of which is divided into picture blocks of pixels, the encoder unit classifying the processing load into one of load levels based on the load information and determining a start pixel within the picture block depending on the load level, calculates a evaluation value based on the pixels specified by the start pixel, calculates an encoding cost based on the evaluation value and selects one of prediction modes to minimize the encoding cost.

According to a second aspect of the present invention, there is provided an encoding apparatus for encoding a moving picture in accordance with load information, comprising:

a subtracting section configured to generate a prediction error signal which corresponds to a difference between a moving picture signal and a prediction picture signal, the moving picture signal forming a picture which is divided into picture blocks of pixels;

a DCT/quantization section configured to perform discrete cosine transformation and quantization on the prediction error signal to generate a transform coefficient signal;

an inverse-DCT and inverse-quantization section configured to perform inverse-DCT and inverse-quantization on the quantized transform coefficient signal to generate a decoding signal;

a decoding section configured to add the prediction picture signal to the decoding signal and generates a reconstructed picture signal;

a deblocking filter configured to filter the reconstructed picture signal;

a frame buffer configured to accumulate reconstructed picture signals after the deblocking;

a start determination section configured to judges a load level based on the load information and determine a start pixel in target pixels of each of blocks depending on the load level, the start pixel specifying pixels in the target pixels; and an intra-prediction section configured to read out the prediction picture signal from the frame buffer, and performs intra prediction in accordance with one of prediction picture modes, the intra-prediction section calculating an evaluation value based on the specified pixels to selecting one of the prediction picture modes.

As described above, in a moving picture encoding apparatus and method, a start pixel for calculating an evaluation value is selected and changed depending on the processing load, so that the pixels which are spatially near to the neighboring pixels used for prediction is excluded from the pixels intended for calculating an evaluation value as the processing load becomes large instead of using an evaluation value calculated for all pixels within a 4×4 pixel block to be encoded when calculating the encoding cost.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, a moving picture encoding apparatus according to an embodiment of the present invention will be described with reference to the accompanying drawings.

Figure 1:
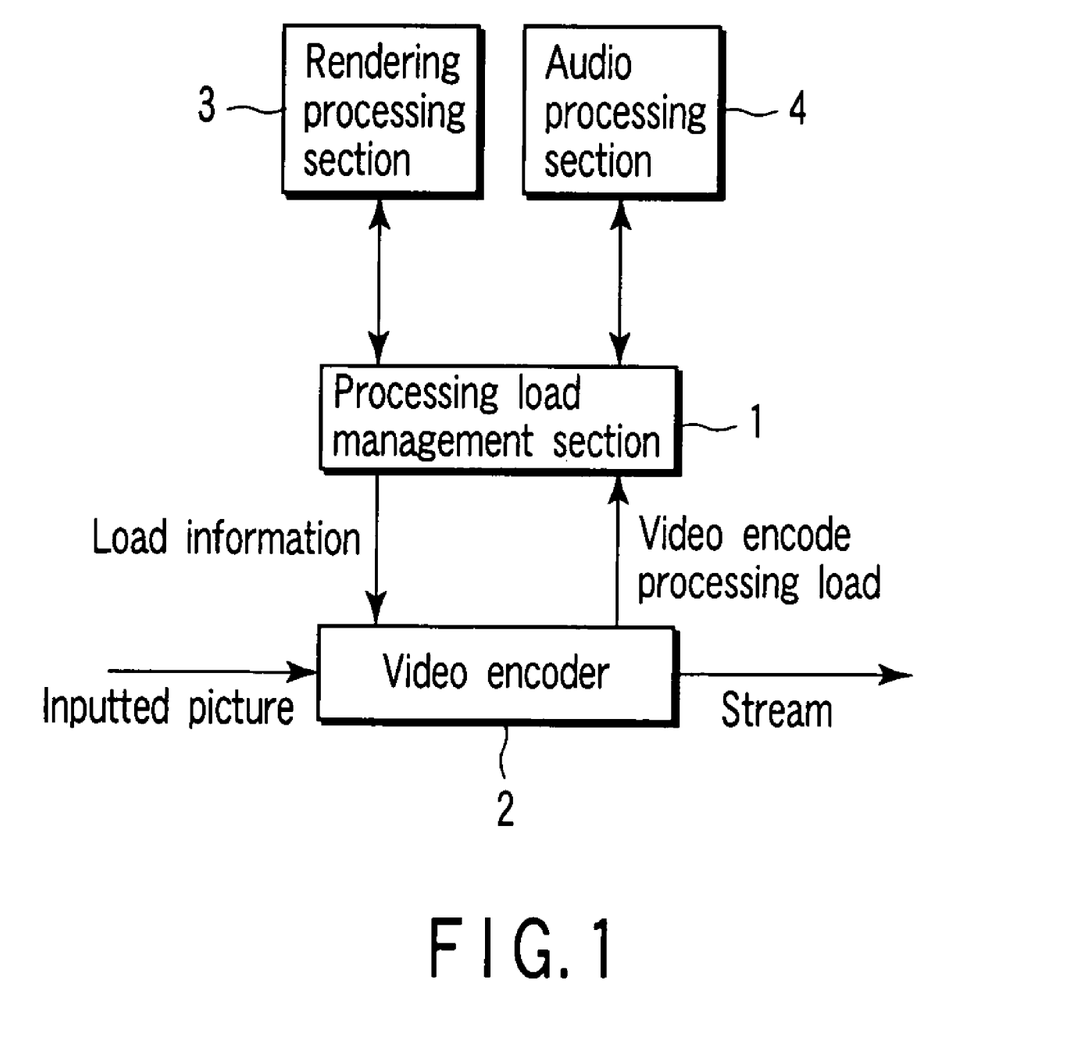
FIG. 1 is a block diagram showing a moving picture encoding apparatus according to one embodiment of the present invention.

FIG. 1 shows a block diagram showing an apparatus for encoding a moving picture according to one embodiment of the present invention. As shown in FIG. 1, the moving picture encoding apparatus includes a video encoder 2 for encoding a video signal, i.e., a moving picture signal and output an encoded video stream. The apparatus is provided with a processing load management section 1 for detecting or monitoring various processing loads and output processing load information to the video encoder 2 to manage the video encoder 2 depending on the detected loads.

In the encoding apparatus, the processing load management section 1 detects not only the load in a rendering processing section 3 for rendering an image, an audio processing section 4 for processing audio data or any other processing section, but also the video encode processing load for encoding video data to produce load information and outputs the load information to the video encoder 2. When receiving the load information, the video encoder 2 varies the evaluation value which is utilized for determining one of the intra-prediction modes, depending on the processing load information. The evaluation value corresponds to the number of pixels of SAD (Sum of Absolute Difference) obtained from the video signal, i.e., the moving picture signal and a reference picture signal, i.e., a prediction picture signal as described later. If substantially no processing load is detected, the evaluation value is calculated from all of the pixels in a target block. However, as the processing load becomes large, a start pixel or pixels is selected, and the evaluation value is calculated from selected pixels specified by the start pixel in the target block. The start pixel or pixels are predetermined and changed in accordance with a level of the processing load, and are so selected from the target pixels as to exclude the pixels which are spatially neighboring to reference pixels which are utilized for prediction and belong to the other blocks neighboring to the target block. This change processing reduces the processing amount for encoding a moving picture in the video encoder.

The processing load management section 1, video encoder 2, rendering processing section 3 and audio processing section 4 shown in FIG. 1 may be realized as software as functional blocks on the CPU performing operations by means of programs. Alternatively, the video encoder 2 or other processing sections may be configured as hardware and the processing load management section 1 may be configured as software by means of a program.

Figure 2:
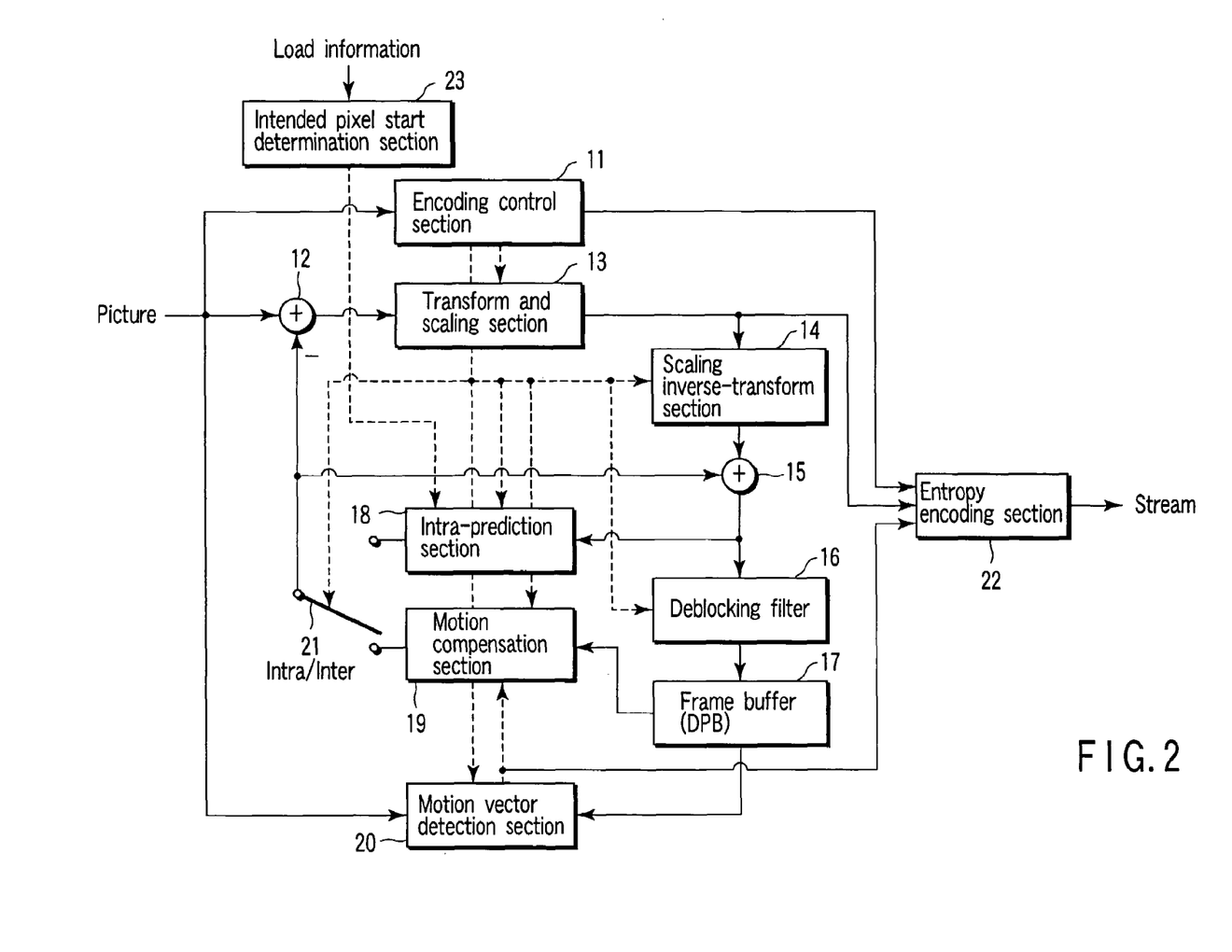
FIG. 2 is a block diagram showing a video encoder shown in FIG. 1.

In FIG. 2, there is shown in detail the video encoder 2 shown in FIG. 1. As shown in FIG. 2, in the moving picture encoding apparatus, the original picture or image is encoded and the encoded data is multiplexed to be outputted as a video stream or a moving picture stream. The video encoder 2 comprises an encoding control section 11, a subtracting section or differentiating section (a subtractor or a differentiator) 12, a discrete cosine transformation (DCT)/quantization section, that is, a transform and scaling section 13, an inverse-discrete cosine transformation (IDCT) and inverse-quantization section, that is, an scaling inverse-transform section 14, a decoding section 15, a deblocking filter 16, a frame buffer 17, an intra-prediction section 18, a motion compensation section 19, a motion vector detection section 20, a selection section 21, an entropy encoding section 22, and a start determination section 23.

The moving picture encoding apparatus shown in FIG. 2 is configured in accordance with H.264/AVC. Accordingly, in the moving picture encoding apparatus, intra prediction by each block of 4×4 pixels and intra prediction by each macro-block (MB) of 16×16 pixels are enabled.

In addition, a case where the pixels used for prediction belong to the same frame as those to be encoded is referred to as an intra-frame prediction (intra prediction) and a case where the pixels used for prediction belong to a different frame from those to be encoded is referred to as an inter-frame prediction (inter prediction).

Figure 3:
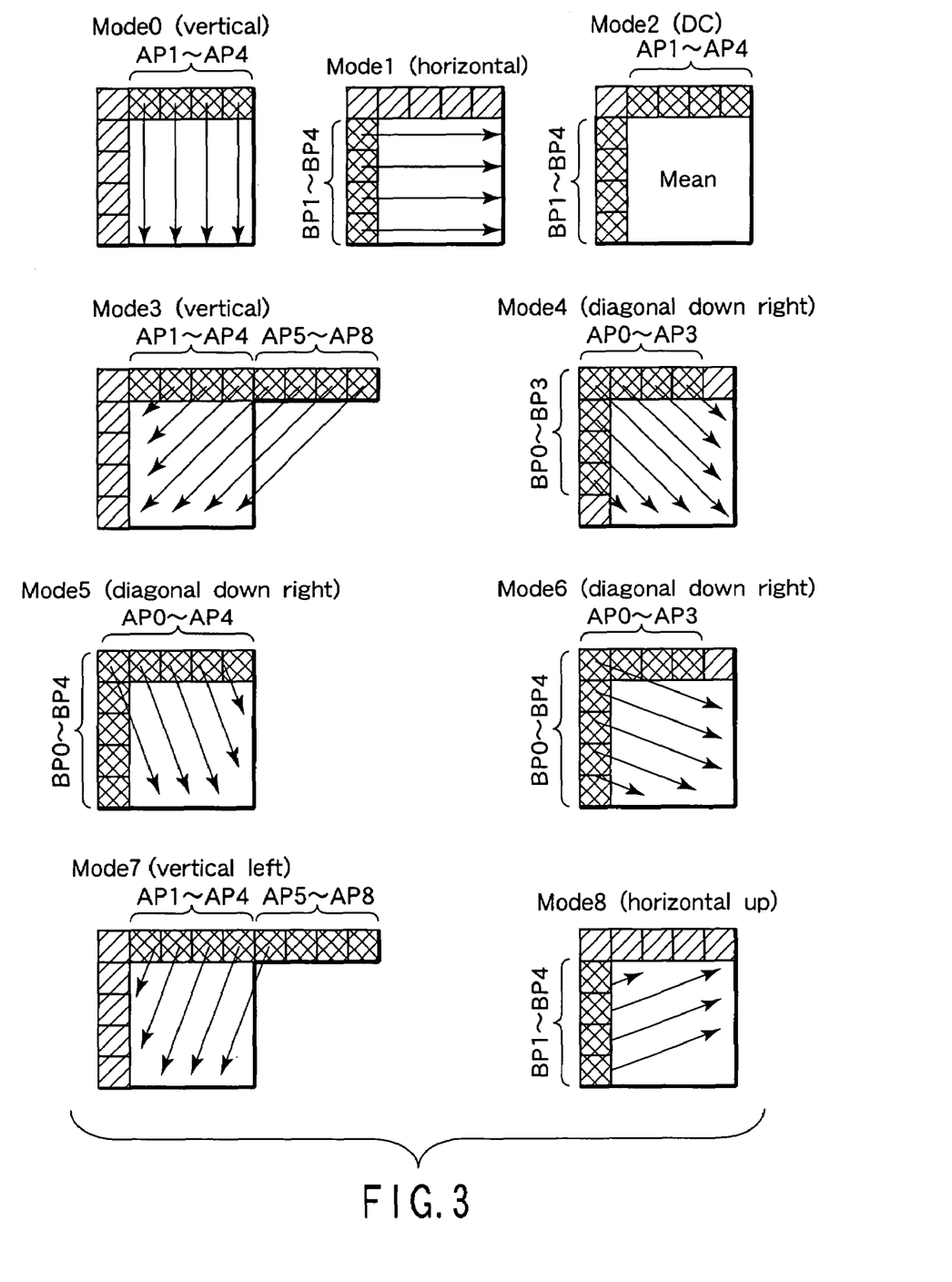
FIG. 3 is a view showing nine prediction modes set in an intra-prediction section shown in FIG. 2.

As shown in FIG. 3, in the intra prediction by each block of 4×4 pixels, there are nine prediction modes from 0 to 8. In each of the nine prediction modes, pixels of neighboring blocks are preliminarily encoded, and the pixels of the encoded blocks are reconstructed again. Thus, the reconstructed pixels of the neighboring blocks are set as the reference pixels. The difference between the original pixels and the reference pixels is encoded. In some cases, pixel may be expressed as picture. In the selecting of one of the intra 4×4 prediction modes, encoding costs for the nine modes are calculated and the calculated encoding costs are compared so that an encoding cost minimizing mode is selected as the optimal encoding mode. Generally, SAD (sum of absolute difference) between the original pixels and the reference pixels is calculated as an encoding cost.

In the vertical mode (mode 0) as shown in FIG. 3, four decoded pixels AP1 to AP4 of the neighboring block are set as the reference pixels, and the 4×4 pixels belonging to the original picture and four decoded pixels AP1 to AP4 of the neighboring block are compared to each other along the vertical direction. Further, in a horizontal mode (mode 1) four decoded pixels BP1 to BP4 of the neighboring block are set as the reference pixels, and the 4×4 pixels as the original pixels and the four decoded pixels BP1 to BP4 of the neighboring block are compared to each other along the vertical direction. In a DC mode (mode 2), an average value of the four decoded pixels AP1 to AP4 or BP1 to BP4 of the neighboring block is set as the reference pixels, and an average value of the four decoded pixels AP1 to AP4 or BP1 to BP4 is compared with the 4×4 pixels as the original pixels. In a diagonal down left mode (mode 3), four decoded pixels AP1 to AP4 of the neighboring blocks and the four pixels AP5 to AP8 neighboring to the four decoded pixels AP1 to AP4 are set as the reference pixels, and the reference pixels and the original pixels are compared to each other along the diagonal down left direction. In a diagonal down right mode (mode 4), four decoded pixels AP0 to AP3 as well as four decoded pixel BP0 to BP3 in a neighboring block are as the reference pixels and the 4×4 pixels as the original pixels and the reference pixels are compared to each other along the diagonal down right direction. In a vertical right mode (mode 5), five decoded pixel AP0 to AP4 in the neighboring blocks are set as the reference pixels, and the reference pixels and the 4×4 pixels as the original pixels are compared to each other along the vertical right direction. Similarly, in a horizontal down mode (mode 6), five decoded pixels BP0 to BP4 in the neighboring blocks are set as the reference pixels, and reference pixels and the 4×4 pixels as the original pixels are compared to each other along the horizontal down direction. In a vertical left mode (mode 7), five pixels AP1 to AP5 among four decoded pixels AP1 to AP8 in the neighboring block are selected and set as the reference pixels, and the four pixels AP5 to AP8 and the 4×4 pixels as the original pixels are compared to each other along the vertical left direction. In a horizontal up mode (mode 8), four decoded pixels BP1 to BP4 of the neighboring block are seta as the reference pixels, and reference pixels and the 4×4 pixels as the original pixels are compared to each other along the horizontal up direction.

In the moving picture encoding apparatus shown in FIG. 2, a moving picture signal, i.e., a video signal of the original picture is input to the subtracting section 12, by each picture, and a prediction picture signal is also input to the subtracting section 12. In the subtracting section 12, the moving picture signal and the prediction picture signal are compared and a difference between the input moving picture signal and the subtracting picture signal is calculated and the subtracting signal is output from the subtracting section 12. The selection section 21 selects one of the intra-prediction section 18 and the motion compensation-prediction section (a motion vector prediction section) 19. Thus, one of the prediction picture signals is output from the intra-prediction section 18 or from the motion compensation section 19, and the selected prediction picture signal is outputted as the reference picture signal to the subtracting section 12.

The subtracting signal is also input to the DCT/quantization section 13. In the DCT/quantization section 13, the subtracting signal is DCT-transformed to be outputted as a quantized transform coefficient signal. The quantized transform coefficient signal is input to the inverse-DCT and inverse-quantization section 14. In the inverse-DCT and inverse-quantization section 14, IDCT and inverse-quantization which are perform inverse DCT and quantification on the transform coefficient signal to create a decoding signal. This decoding signal is input to the decoding section 15. In the decoding section 15, the selected prediction picture signal and the decoding signal are added to create a decoding picture signal. The decoding picture signal is filtered by the deblocking filter 16. The deblocked decoding picture signal from the deblocking filter 16 is accumulated in the frame buffer (DPB) 17. This processing is repeatedly performed on a plurality of frame pictures, sequentially storing reference picture signals of a plurality of frames before and behind the moving picture signal to be encoded in the frame buffer (DPB) 17.

The filtering in the deblocking filter 16 is equivalent to a filter processing for reducing the distortion of a block produced in encoding a picture. The application thereof is specific to H.264/AVC, and before storing the decoded picture in the frame buffer 17, the block distortion is removed adaptively in the deblocking filter 16.

The intra-prediction section 18 reads the reference picture signals stored in the frame buffer 17, performs intra prediction, and creates a prediction picture signal and an evaluation value for mode selection. At this time, the start determination section 23 determines a start pixel from predetermined pixels in the target block based on the load information to calculate the evaluation value. The start pixel is so selected and changed as to exclude the pixels which are spatially neighboring to the reference pixels used for prediction depending on the load information.

The motion vector detection section 20 reads the reference picture signals stored in the frame buffer 17 to detect by each macro-block the best part (coordinate) of the reference picture. That is, motion vectors between the frames by each macro-block are detected. Generally, since the motion vectors have a strong correlation with the motion vectors of the neighboring blocks, they are predicted from the neighbouring blocks. In H.264/AVC, the motion vectors are predicted from the motion vectors of the neighboring blocks by using a median value. However, since motion compensation in a variable block size or motion compensation from multiple reference pictures is used, more precise processing is required as a matter of course. After having received the motion vectors detected in the motion vector detection section 20, the motion compensation section 19 performs a prediction of motion compensations by the relevant motion vectors between the reference picture signal and the moving picture signal, that is, the section 19 performs inter prediction, to create a reference picture signal and an evaluation value.

The evaluation shows the similarity between the moving picture signal and the reference picture signal, and the sum of square differences (SSD) of the reference picture signal and the moving picture signal is generally used other than SAD. When calculating such an evaluation value, based on the load information transmitted from the processing load management section 1, the start determination section 23 changes the number of the pixels for obtaining the evaluation value used in determination of the intra-prediction mode depending on the processing load. That is, the start pixel for calculating the evaluation value is changed so as to exclude the pixels spatially neighboring to the reference pixels which are used for prediction as the processing load becomes large. Thereby, the processing amount thereof is reduced. The details thereof will be described later. The reference picture signal and the evaluation value are input to the selection section 21.

The encoding control section 11 selects an encoding method (encoding mode) by each picture or by a further smaller unit or selects the parameter thereof to control the generated bit amounts. Further, the entropy encoding section 22 assigns high-frequency information by means of a short code and low-frequency information by means of a long code to reduce the generated bit amounts as a whole, thereby output a stream in which the encoded data is multiplexed.

Now, the processing procedure for determining one of the intra-prediction modes in the moving picture encoding apparatus according to one embodiment of the present invention will be described in detail with reference to the flowchart shown in FIG. 4. In addition, FIGS. 5 to 9 will be appropriately referred to in the following description.

Figure 5:
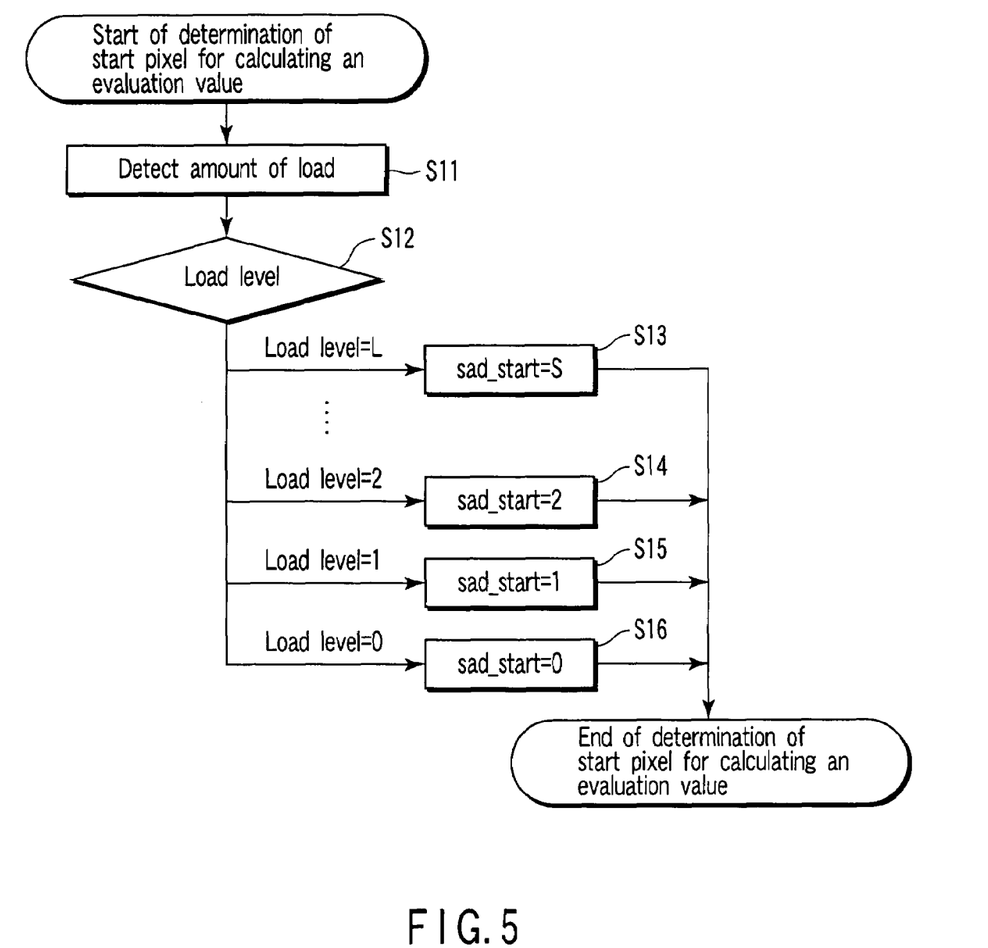
FIG. 5 is a flowchart showing a processing procedure of a sub-routine "Determination of the start pixel for calculating an evaluation value" executed in Step in FIG. 4.
Figure 6:
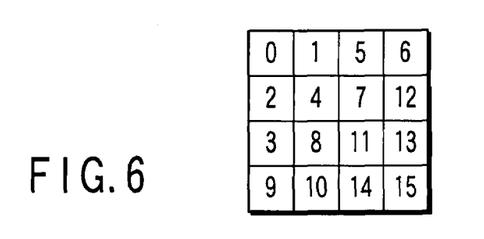
FIG. 6 is a conceptual view showing a relationship between the pixel positions of the 4×4 pixel block and a starting SAD-pixel (pattern 1, S=15)
Figure 7:
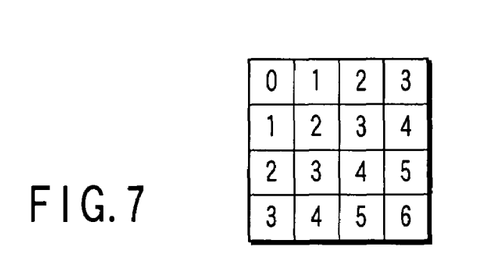
FIG. 7 is a conceptual view showing a relationship between the pixel positions of the 4×4 pixel block and starting SAD-pixel (pattern 2, S=6)
Figure 8:
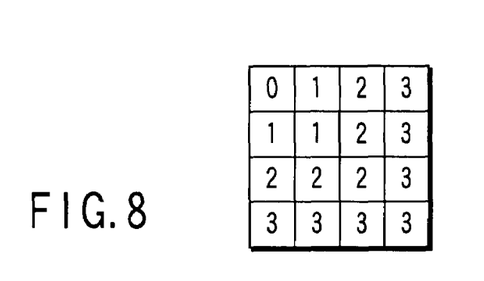
FIG. 8 is a conceptual view showing a relationship between the pixel positions of the 4×4 pixel block and starting SAD-pixel (pattern 3, S=3)
Figure 9:
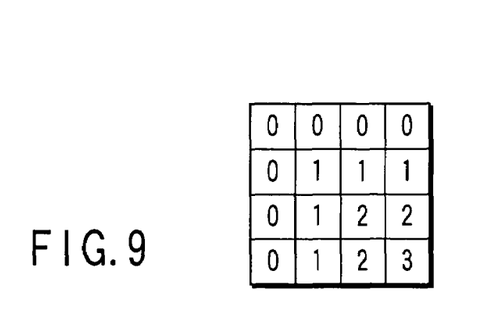
FIG. 9 is a conceptual view showing a relationship between the pixel positions of the 4×4 pixel block and starting SAD-pixel (pattern 4, S=3).

Now, when the processing for determining one of the intra-prediction modes is started, the sub-routine "Determination of the start pixel for calculating an evaluation value" is executed (Step S1). That is, as shown in FIG. 5, when starting the sub-routine "Determination of the start pixel for calculating an evaluation value", the processing load management section 1 firstly detects the amount of load (Step S11) and judges the load level on the video encoder side (Step S12). The processing load management section 1 detects a level of current consumed in the CPU by the rendering processing or audio processing and outputs it as the load level (load information). This load level is compared with threshold levels of current consumed in the CPU, as an example, and outputs the load information as a load level 0, 1, 2, . . . L depending on the threshold level.

When the load level is judged, the start pixel [sad_start (0 to S)] for calculating an evaluation value is determined depending on the load level 0, 1, 2, . . . L (Steps S13 to S16), the determination processing for determining the start pixel for calculating an evaluation value is ended, and the processing procedure is returned to the start of the determination processing of the starting points of pixels for calculating an evaluation value. The start pixel [sad_start (0 to S)] is predetermined in each 4×4 pixels. That is, at the load level 0, the start pixel [sad_start] in the target pixels for calculating an evaluation value is set to have pixel number "0" (sad_start=0), and all target pixels having pixel number "0" to pixel number "S" are processed to calculate an evaluation value. Further, at the load level 1, the start pixel [sad_start] in the target pixels for calculating the evaluation value is set to have a pixel number "1" (sad_start=1), and the pixels having pixel number "1" to pixel number "S" are processed to calculate an evaluation value. At the load level 2 or more (L−1), a similar processing is performed. At the load level L, the start pixel [sad_start] in the target pixels for calculating the evaluation value is set to have pixel number "S" (sad_start=S), and the pixels only having pixel number "S" are processed to calculate an evaluation value.

In addition, FIGS. 6 to 9 show relationships between the pixel positions of the 4×4 pixel block and the start pixel [sad_start (0 to S)] in the target pixels for calculating an evaluation value. Here, a case where the above SAD is used as an evaluation value will be described, and the evaluation value is referred to as SAD below. The numerals in FIGS. 6 to 9 denote pixel number "1" to pixel number "15" in the target pixels, and there are four patterns 1 to 4 for assigning pixel number "1" to pixel number "15" as shown in FIGS. 6 to 9.

FIG. 6, FIG. 7, FIG. 8 and FIG. 9 show relationships in the pattern 1 (S=15), pattern 2 (S=6), pattern 3 (S=3) and pattern 4 (S=3), respectively. In addition, the start pixel for calculating SAD may not be limited to only one pixel but also anyone pixel in a group of pixels having same pixel number.

Figure 4:
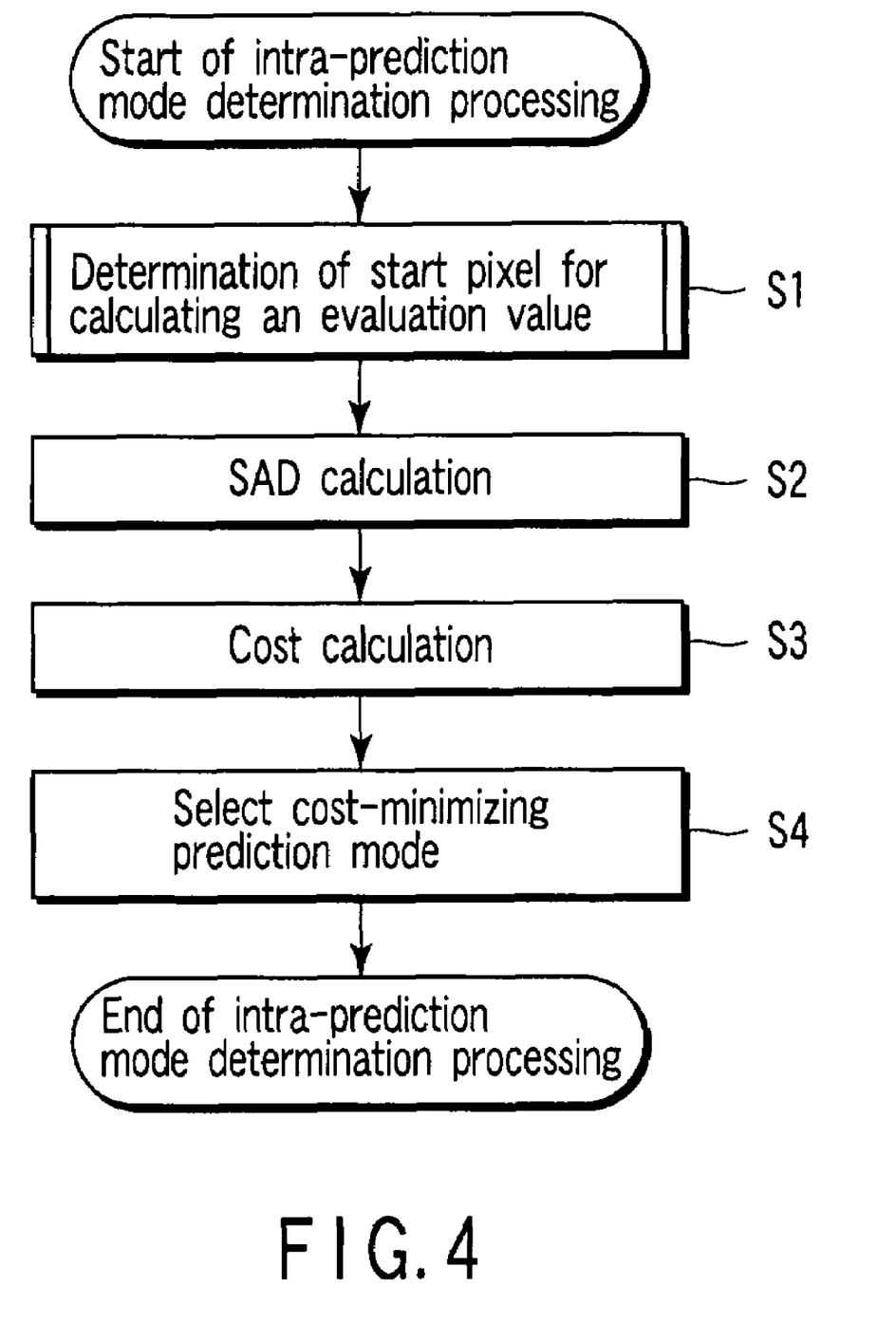
FIG. 4 is a flowchart showing a processing procedure for determining an intra-prediction mode in the moving picture encoding apparatus shown in FIG. 2.

As shown in FIG. 4, the SAD is calculated based on the start pixel for calculating the SAD (Step S2). Here, the SAD is calculated for the pixels from the start pixel to S.

Based on the SAD, an encoding cost is calculated (Step S3). More specifically, if the number of pixels used for the SAD is set to n, by adding the SAD_n for the target pixels within the 4×4 pixel block and the encoding cost (n/16)×p× λ(Qp) for the amount of codes of the encoding mode information (vertical prediction and horizontal prediction), the Cost_n of the intra, 4×4 prediction is calculated from the following equation:

$$\mathrm{Cost}\_n = \mathrm{SAD}\_n + (n/16) \times p \times \lambda(Qp)$$

where λ is a constant determined by a quantized parameter Qp in the Lagrange undetermined multiplier, and p is a value which is 0 in a case of corresponding to a prediction mode obtained from the neighboring block and is 1 in other cases.

After the encoding cost has been calculated, the encoding cost minimizing mode is selected (Step S4) and a series of processes are ended.

As described above, in the moving picture encoding apparatus according to one embodiment of the present invention, when calculating the encoding cost in the intra 4×4 prediction, the processing load is detected and the start pixel in the target pixels for calculating the SAD is changed so as to exclude the pixels which are spatially neighboring to the reference pixels used for prediction as the relevant processing load becomes large and the SAD is calculated for the start pixel to the last pixel having maximum pixel number in stead of calculating all target pixels within a 4×4 pixel block. Thus, a calculating process is refined to obtain an evaluation value, thereby enabling the picture processing amount to be reduced while suppressing the deterioration of the encoding performance.

Though the embodiment of the present invention has been described, the present invention is not limited thereto, and various improvements and changes may be made. For example, the application scope is not limited to the intra 4×4 prediction and covers the intra 8×8 prediction and the intra 16×16 prediction as a matter of course.

According to the present invention, a moving picture encoding apparatus can be provided in which, when calculating the encoding cost, start pixel of pixels intended for calculating an evaluation value is changed so that the pixels which are spatially near to the neighboring pixels used for prediction is excluded from the pixels intended for calculating the evaluation value as the processing load becomes large instead of using an evaluation value calculated for all pixels within a 4×4 pixel block to be encoded, thereby reducing the picture processing amount while suppressing the deterioration of the encoding performance.

Additional advantages and modifications will readily occur to those skilled in the art. Therefore, the invention is not limited to the specific details and representative embodiments shown and described herein.

What is claimed is:

1. An encoding apparatus for encoding a moving picture, comprising:
    a detection unit configured to detect a processing load to output load information; and
    an encoder unit configured to encode the moving picture in accordance with one of a plurality of prediction modes, the moving picture composed of pictures each of which is divided into picture blocks of pixels,
    wherein the encoder unit is configured to:
        classify the processing load into one of a plurality of load levels based on the load information,
        determine a start pixel in target pixels within each of the picture blocks depending on the load level, the start pixel specifying pixels in the target pixels,
        calculate a evaluation value based on the pixels specified by the start pixel, wherein the specified pixels exclude pixels which are spatially neighboring pixels used for prediction, calculate an encoding cost based on the evaluation value, and select one of the prediction modes to minimize the encoding cost.

2. The moving picture encoding apparatus according to claim 1, wherein the encoder unit includes a calculating section which is configured to calculate the evaluation value, and to which a moving picture signal composing the pictures is input, and wherein the evaluation value corresponds to a sum of absolute difference obtained from the moving picture signal and a prediction picture signal.

3. The moving picture encoding apparatus according to claim 2, wherein the encoder unit calculates the encoding cost by adding the sum of absolute difference with respect to the specified pixels within one of the picture blocks to the encoding cost with respect to a bit amount of an encoding mode.

4. The moving picture encoding apparatus according to claim 1, wherein the load includes at least one of a rendering load, audio processing load and video encode processing load.

5. An encoding apparatus for encoding a moving picture in accordance with load information, comprising:

a subtracting section configured to generate a prediction error signal which corresponds to a difference between a moving picture signal and a prediction picture signal, the moving picture signal forming a picture which is divided into picture blocks of pixels;

a DCT/quantization section configured to perform discrete cosine transformation and quantization on the prediction error signal to generate a transform coefficient signal;

an inverse-DCT and inverse-quantization section configured to perform inverse-DCT and inverse-quantization on the quantized transform coefficient signal to generate a decoding signal;

a decoding section configured to add the prediction picture signal to the decoding signal and generate a reconstructed picture signal;

a deblocking filter configured to filter the reconstructed picture signal;

a frame buffer configured to accumulate reconstructed picture signals after the deblocking;

a start determination section configured to judge a load level based on the load information and determine a start pixel in target pixels of each of the blocks depending on the load level, the start pixel specifying pixels in the target pixels, wherein the specified pixels exclude pixels which are spatially neighboring pixels used for prediction; and an intra-prediction section configured to read out a reconstructed picture signal as a reference picture signal from the frame buffer, and perform intra prediction on the reference picture signal in accordance with one of a plurality of prediction modes, the intra-prediction section calculating an evaluation value based on the specified pixels to select one of the prediction modes.

6. The moving picture encoding apparatus according to claim 5, wherein the evaluation value corresponds to a sum of absolute difference obtained from the moving picture signal and the prediction picture signal.

7. The moving picture encoding apparatus according to claim 6, wherein the intra-prediction section calculates an encoding cost by adding a sum of absolute difference with respect to the specified pixels within one of the blocks to the encoding cost with respect to a bit amount of an encoding mode.

* * * * *